United States Patent
Kitamura et al.

(10) Patent No.: US 6,637,414 B2
(45) Date of Patent: Oct. 28, 2003

(54) CONTROL SYSTEM FOR INTERNAL COMBUSTION ENGINE

(75) Inventors: Toru Kitamura, Wako (JP); Makoto Kobayashi, Wako (JP); Koichi Hidano, Wako (JP); Takeshi Tagami, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 77 days.

(21) Appl. No.: 10/060,382

(22) Filed: Feb. 1, 2002

(65) Prior Publication Data

US 2002/0104513 A1 Aug. 8, 2002

(30) Foreign Application Priority Data

Feb. 2, 2001 (JP) ........................................ 2001-026262

(51) Int. Cl.[7] .............................................. F02M 51/00
(52) U.S. Cl. ....................................... 123/494; 123/478
(58) Field of Search ................................ 123/494, 478, 123/480; 73/119 A, 116

(56) References Cited

U.S. PATENT DOCUMENTS

| | | | | |
|---|---|---|---|---|
| 5,218,941 A | * | 6/1993 | Suzuki et al. | 123/478 |
| 5,483,940 A | * | 1/1996 | Namba et al. | 123/497 |
| 5,560,340 A | * | 10/1996 | Tomisawa | 123/494 |
| 5,699,772 A | * | 12/1997 | Yonekawa et al. | 123/497 |

FOREIGN PATENT DOCUMENTS

JP 7-166919 6/1995

* cited by examiner

*Primary Examiner*—Mahmoud Gimie
(74) *Attorney, Agent, or Firm*—Arent Fox Kintner Plotkin & Kahn, PLLC

(57) ABSTRACT

A control system for an internal combustion engine is disclosed. The engine is provided with at least one fuel injection valve for injecting fuel supplied from a fuel tank into an intake pipe of the engine. The fuel injection amount is controlled by controlling the valve opening period of the at least one fuel injection valve. A pressure difference between the pressure of fuel to be supplied to the at least one fuel injection valve and the pressure in the fuel tank is controlled such that the difference is at a constant value. The pressure in the fuel tank and the pressure in the intake pipe are detected. A correction amount is calculated according to the pressure in the fuel tank and the pressure in the intake pipe, and the valve opening period of the at least one fuel injection valve is corrected using the calculated correction amount. A required amount of fuel to be supplied to the engine is calculated according to an operating condition of the engine. The change rate of the correction amount is corrected according to the required fuel amount.

18 Claims, 4 Drawing Sheets

CONTROL SYSTEM FOR INTERNAL COMBUSTION ENGINE

BACKGROUND OF THE INVENTION

The present invention relates to a control system for an internal combustion engine, and more particularly to a control system for an internal combustion engine mounted on a vehicle including a pressure regulator for regulating the pressure of fuel to be supplied to the internal combustion engine on the basis of the pressure in a fuel tank.

A known fuel supply control system, disclosed in Japanese Patent Laid-open No. Hei 7-166919, is configured such that a fuel pump and a pressure regulator are provided in a fuel tank. In this control system, the fuel pressure is regulated on the basis of the pressure in the fuel tank and then the pressure-regulated fuel is supplied to an internal combustion engine via a fuel injection valve. According to this control system, the fuel pressure is controlled by the pressure regulator so that a pressure difference between the fuel pressure and the pressure in the fuel tank is kept at a constant value, and the valve opening period of the fuel injection valve is corrected according to the pressure in the fuel tank and the pressure in the intake pipe of the engine. Such correction of the fuel pressure and the valve opening period of the fuel injection valve is employed because the amount of the fuel to be injected in the intake pipe of the internal combustion engine via the fuel injection valve changes depending on the fuel pressure and the pressure in the intake pipe even if the valve opening period of the fuel injection valve is kept constant, and the fuel pressure changes along with a change in pressure in the fuel tank.

When the pressure in the fuel tank changes, however, there is a time lag until the change in pressure in the fuel tank actually exerts an effect on the fuel injection amount. Such a time lag changes depending on the required fuel amount of the engine, that is, the amount of fuel to be supplied to the engine. As a result, the correction of the valve opening period of the fuel injection valve according to the pressure in the fuel tank and the pressure in the intake pipe is insufficient. Therefore, it has been expected to further improve the accuracy of the fuel injection amount control.

SUMMARY OF THE INVENTION

An object of the present invention is to provide a control system for an internal combustion engine, which can more accurately control the amount of fuel to be injected by the fuel injection valve, when regulating the fuel pressure on the basis of the pressure in the fuel tank.

To achieve the above object, there is provided a control system for an internal combustion engine, including at least one fuel injection valve, fuel injection amount control means, fuel pressure control means, fuel tank pressure detecting means, intake pipe pressure detecting means, first correcting means, required fuel amount calculating means, and second correcting means. The at least one fuel injection valve injects fuel supplied from a fuel tank into an intake pipe of the engine. The fuel injection amount control means controls the fuel injection amount by controlling the valve opening period of the at least one fuel injection valve. The fuel pressure control means is provided in the fuel tank and controls the pressure difference between the pressure of fuel to be supplied to the at least one fuel injection valve and the pressure in the fuel tank such that the pressure difference is at a constant value. The fuel tank pressure detecting means detects the pressure in the fuel tank and the intake pipe pressure detecting means detects the pressure in the intake pipe. The first correcting means calculates a correction amount as a function of the pressure in the fuel tank and the pressure in the intake pipe, and corrects the valve opening period of the at least one fuel injection valve as a function of the calculated correction amount. The required fuel amount calculating means calculates a required amount of fuel to be supplied to the engine as a function of an operating condition of the engine. The second correcting means corrects a change rate of the correction amount calculated by the first correcting means, according to the required fuel amount.

With this configuration, the valve opening period of the fuel injection valve is corrected according to both the pressure in the fuel tank and the pressure in the intake pipe, and the change rate of the correction amount of the valve opening period is corrected according to the required amount of fuel to be supplied to the engine. As the required fuel amount (which is the amount of fuel to be injected by one opening of the fuel injection valve) becomes large, a time lag until the change in pressure in the fuel tank actually exerts an effect on the fuel injection amount becomes long. Accordingly, the amount of a fuel to be injected by the fuel injection valve can be accurately controlled by reducing the change rate of the correction amount calculated according to the pressure in the fuel tank.

The first correcting means preferably corrects the valve opening period of the fuel injection valve so that the valve opening period becomes longer as the pressure in the intake pipe becomes higher.

The first correcting means preferably corrects the valve opening period of the fuel injection valve so that the valve opening period becomes shorter as the pressure in the fuel tank becomes higher.

The second correcting means preferably corrects the change rate of the correction amount of the valve opening period so that the change rate decreases as the required fuel amount increases.

The control system preferably further includes pressure reducing means for reducing the pressure in the fuel tank to a value which is lower than the atmospheric pressure during operation and stoppage of the engine.

When the control system includes the pressure reducing means, the above-described effect of the present invention may be more positive, since a change in pressure in the fuel tank is large.

The second correcting means may correct the change rate of the correction amount calculated by the first correcting means, according to a non-corrected value of the valve opening period of the at least one fuel injection valve, instead of correcting the change rate of the correction amount according to the required fuel amount.

BRIEF DESCRIPTION OF THE DRAWINGS

FIGS. 3A and 3B show tables used in the process shown in FIG. 2, and FIG. 3C is a diagram for illustrating how to set the correction coefficients on the tables.

DETAILED DESCRIPTION OF THE PREFERRED EMBODIMENTS

Hereinafter, preferred embodiments of the present invention will be described with reference to the drawings.

Figure 1:
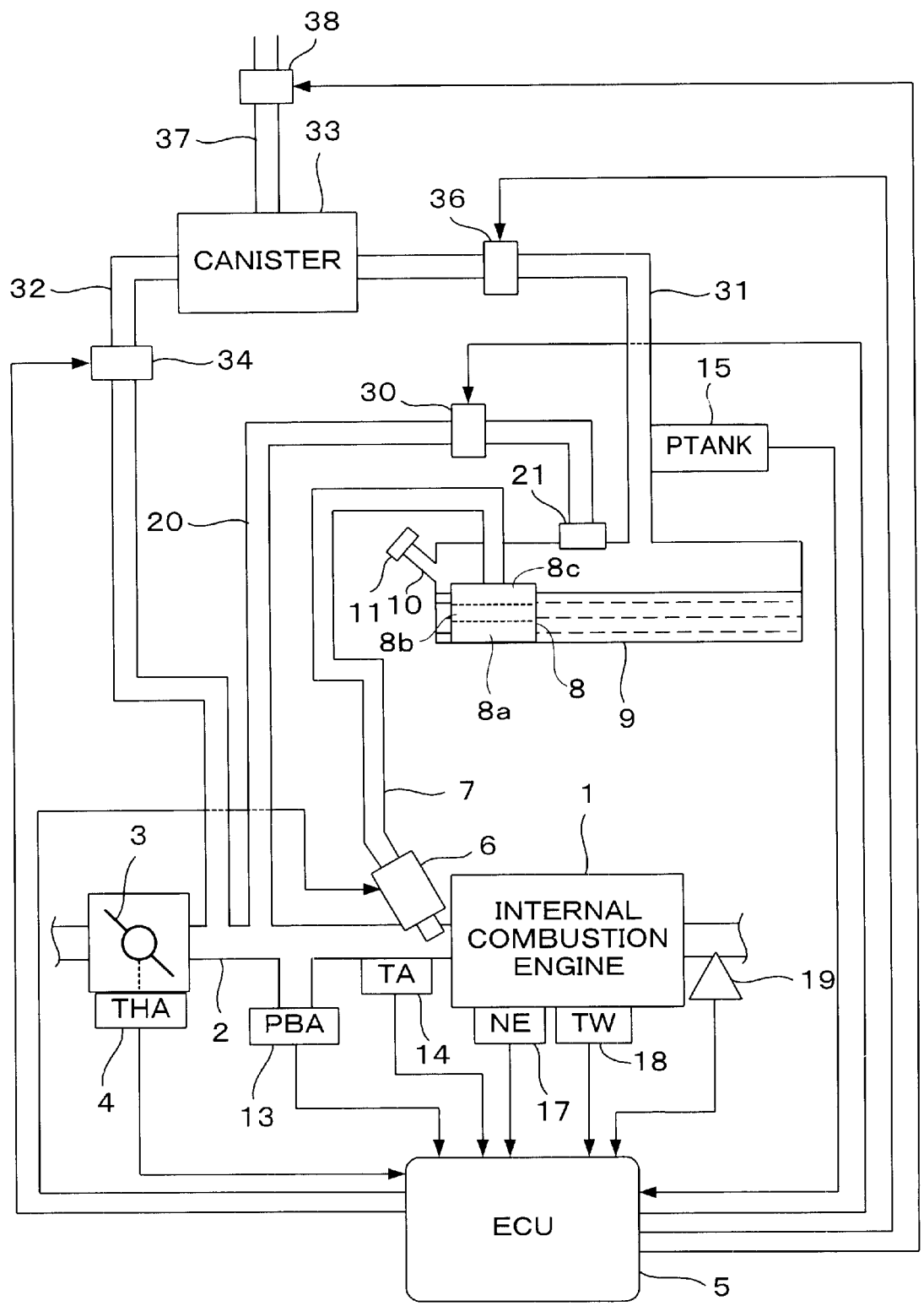
FIG. 1 is a schematic diagram of an internal combustion engine and a control system therefor according to one embodiment of the present invention.

FIG. 1 is a schematic diagram showing the configuration of an internal combustion engine, a control system therefor, and an evaporative fuel emission preventing device for preventing emission of evaporative fuel generated in a fuel tank into the atmosphere, according to an embodiment of the present invention. Referring to FIG. 1, reference numeral 1 denotes an internal combustion engine (which will be hereinafter referred to simply as "engine") having a plurality of (e.g., four) cylinders. The engine 1 is provided with an intake pipe 2, in which a throttle valve 3 is mounted. A throttle valve opening (THA) sensor 4 is connected to the throttle valve 3. The throttle valve opening sensor 4 outputs an electrical signal corresponding to the opening angle of the throttle valve 3 and supplies the electrical signal to an electronic control unit (which will be hereinafter referred to as "ECU") 5.

Fuel injection valves, only one of which is shown, are inserted into the intake pipe 2 at locations intermediate between the cylinder block of the engine 1 and the throttle valve 3 and slightly upstream of the respective intake valves (not shown). All the fuel injection valves 6 are connected through a fuel supply pipe 7 to a fuel pump unit 8 provided in a fuel tank 9 having a hermetic structure. The fuel pump unit 8 is configured by integrating a fuel pump 8a, a fuel strainer 8b, and a pressure regulator 8c having a reference pressure set to a tank pressure (the pressure in the fuel tank 9). The fuel pressure PF to be supplied to each of the fuel injection valves 6 is regulated by the pressure regulator 8c so that the pressure difference between the fuel pressure PF and the tank pressure PTANK (PF-PTANK) is kept at a constant pressure (for example, about 3.5 kgf/cm$^2$).

The fuel tank 9 has a fuel inlet port 10 for refueling and a filler cap 11 is mounted on the fuel inlet 10.

Each fuel injection valve 6 is electrically connected to the ECU 5, and its valve opening period is controlled by a signal from the ECU 5. The intake pipe 2 is provided with an intake pipe absolute pressure (PBA) sensor 13 (intake pipe pressure detecting means) for detecting the absolute pressure PBA in the intake pipe 2 and an intake air temperature (TA) sensor 14 for detecting the air temperature TA in the intake pipe 2 at positions downstream of the throttle valve 3. The fuel tank 9 is provided with a tank pressure sensor 15 as the tank pressure detecting means for detecting the pressure in the fuel tank 9, i.e., the tank pressure PTANK.

An engine rotational speed NE sensor 17 for detecting the engine rotational speed is disposed near the outer periphery of a camshaft or a crankshaft (both not shown) of the engine 1. The engine rotational speed sensor 17 outputs a pulse (TDC signal pulse) at a predetermined crank angle per 180° rotation of the crankshaft of the engine 1. There are also provided an engine coolant temperature sensor 18 for detecting the coolant temperature TW of the engine 1 and an oxygen concentration sensor (which will be hereinafter referred to as "LAF sensor") 19 for detecting the oxygen concentration in exhaust gases from the engine 1. Detection signals from these sensors 13 to 19 are supplied to the ECU 5. The LAF sensor 19 is a wide-area air-fuel ratio sensor adapted to output a signal substantially proportional to the oxygen concentration in exhaust gases (proportional to the air-fuel ratio of air-fuel mixture supplied to the engine 1).

There will now be described a configuration of the evaporative fuel emission preventing device for preventing the emission of evaporative fuel by keeping a pressure in the fuel tank at a negative pressure (i.e. a pressure which is lower than the atmospheric pressure). The fuel tank 9 is connected through a first evaporative fuel passage 20 to the intake pipe 2 at a position downstream of the throttle valve 3. The first evaporative fuel passage 20 is provided with a tank pressure control valve 30 for opening and closing the first evaporative fuel passage 20 to control the pressure in the fuel tank 9. The tank pressure control valve 30 is a solenoid valve for controlling the flow of evaporative fuel from the fuel tank 9 to the intake pipe 2 by changing the on-off duty ratio of a received control signal (the opening degree of the control valve). The operation of the control valve 30 is controlled by the ECU 5. The control valve 30 may be a linearly controlled type solenoid valve whose opening degree is continuously changeable.

A cut-off valve 21 is provided at the connection between the evaporative fuel passage 20 and the fuel tank 9. The cut-off valve 21 is a float valve adapted to be closed when the fuel tank 9 is filled up or when the inclination of the fuel tank 9 is increased.

A canister 33 is connected through a charging passage 31 to the fuel tank 9, and is also connected through a purging passage 32 to the intake pipe 2 at a position downstream of the throttle valve 3.

The charging passage 31 is provided with a charge control valve 36. The operation of the charge control valve 36 is controlled by the ECU 5 in such a manner that the charge control valve 36 is opened in refueling to introduce the evaporative fuel from the fuel tank 9 to the canister 33, and is otherwise closed. The tank pressure sensor 15 is actually mounted on the charge passage 31 at a position near the fuel tank 9 as shown in FIG. 1.

The canister 33 contains active carbon for adsorbing the evaporative fuel in the fuel tank 9. The canister 33 is adapted to communicate with the atmosphere through an air passage 37.

The air passage 37 is provided with a vent shut valve 38. The vent shut valve 38 is a normally closed valve, and its operation is controlled by the ECU 5 in such a manner that the vent shut valve 38 is opened in refueling or during purging, and is otherwise closed.

The purging passage 32 connected between the canister 33 and the intake passage 2 is provided with a purge control valve 34. The purge control valve 34 is a solenoid valve capable of continuously controlling the flow by changing the on-off duty ratio of a received control signal (the opening degree of the control valve). The operation of the purge control valve 34 is controlled by the ECU 5.

The ECU 5 includes an input circuit having various functions including the function of shaping the waveforms of input signals from the various sensors, the function of correcting the voltage levels of the input signals to a predetermined level, and the function of converting analog signal values into digital signal values, a central processing unit (which will be hereinafter referred to as "CPU"), a memory circuit preliminarily storing various operational programs to be executed by the CPU and for storing the results of computation or the like by the CPU, and an output circuit for supplying drive signals to the fuel injection valves 6, the tank pressure control valve 30, the purge control valve 34, the charge control valve 36, and the vent shut valve 38.

The CPU of the ECU 5 calculates a required fuel amount TCYL as an amount of fuel to be supplied to the engine 1. The required fuel amount TCYL is calculated according to engine operating parameters such as the engine rotational speed NE, the intake pipe absolute pressure PBA, and the engine water temperature TW. More specifically, the required fuel amount TCYL is calculated as a time period for opening the fuel injection valve 6 obtain an accurate fuel injection amount in a reference condition where both the intake pipe absolute pressure PBA and the tank pressure PTANK are equal to the atmospheric pressure.

$$TCYL=TI \times K1+K2 \tag{1}$$

In the expression (1), TI designates a basic fuel injection period for the fuel injection valve 6, and is determined by retrieving a TI map set according to the engine rotational speed NE and the intake pipe absolute pressure PBA. The TI map is set so that the air-fuel ratio of an air-fuel mixture supplied to the engine 1 substantially becomes the stoichiometric air-fuel ratio in an operating condition corresponding to the engine rotational speed NE and the intake pipe absolute pressure PBA on the map.

In the expression (1), K1 designates a product of various correction coefficients such as a target air-fuel ratio coefficient set according to an engine operating condition, an air-fuel ratio correction coefficient set according to an output from the LAF sensor 19, and an engine water temperature correction coefficient set according to the engine water temperature TW. K2 designates a correction term set to optimize an acceleration characteristic or the like of the engine.

The CPU of the ECU 5 calculates a valve opening period TOUT of the fuel injection valve 6 that is opened in synchronism with the TDC signal pulse, by correcting the required fuel amount TCYL using the following expression (2).

$$TOUT=KFUELP \times TCYL \tag{2}$$

In the expression (2), KFUELP designates a fuel pressure correction coefficient calculated by a process shown in FIG. 2 (which will be described later). According to the expression (2), the valve opening period TOUT is obtained by multiplying the required fuel amount TCYL by the fuel pressure correction coefficient KFUELP. Therefore, it is possible to obtain an accurate fuel injection amount corresponding to the required fuel amount TCYL, that is, to inject an accurate amount of fuel according to an engine operating condition into the intake pipe 2, even if the tank pressure PTANK and/or the intake pipe absolute pressure PBA change.

Further, the CPU of the ECU 5 controls the operation of the solenoid valves according to various conditions as in refueling or in the normal operation of the engine 1 in the following manner. In refueling, the charge control valve 36 and the vent shut valve 38 are opened as mentioned above. Accordingly, the evaporative fuel generated in the fuel tank 9 by refueling is stored into the canister 33 through the charge control valve 36, and the air separated from the fuel is released through the vent shut valve 38 into the atmosphere. Thus, the emission of the evaporative fuel into the atmosphere in refueling can be prevented.

In the normal operation of the engine 1, the charge control valve 36 is closed and the vent shut valve 38 is opened. In this condition, the purge control valve 34 is controlled to be opened to thereby apply the negative pressure in the intake pipe 2 to the canister 33. Accordingly, the atmospheric air is supplied through the vent shut valve 38 to the canister 33, and the fuel adsorbed by the canister 33 is purged through the purge control valve 34 into the intake pipe 2. Thus, the evaporative fuel generated in the fuel tank 9 is not released into the atmosphere, but is supplied to the intake pipe 2, then being subjected to combustion in the combustion chamber of the engine 1. Further, if predetermined conditions are satisfied in the normal operation of the engine 1, the tank pressure control valve 30 is opened to apply the negative pressure in the intake pipe 2 directly to the fuel tank 9, thereby performing the negative pressurization control for reducing the pressure PTANK in the fuel tank 9 to a target pressure which is lower than the atmospheric pressure. In this case, the target pressure P0 is set taking an estimated rise in the tank pressure PTANK into consideration so that the negative pressure in the fuel tank 9 may be maintained also after stoppage of the engine 1, as disclosed, for example, in Japanese Patent Laid-Open No. Hei 10-281019. The target pressure P0 may be set as an absolute pressure or may alternatively be set so that the pressure difference between the tank pressure and the atmospheric pressure may be a predetermined pressure (for example, approximately 40 to 47 kPa (=300 to 350 mmHg)).

Figure 2:
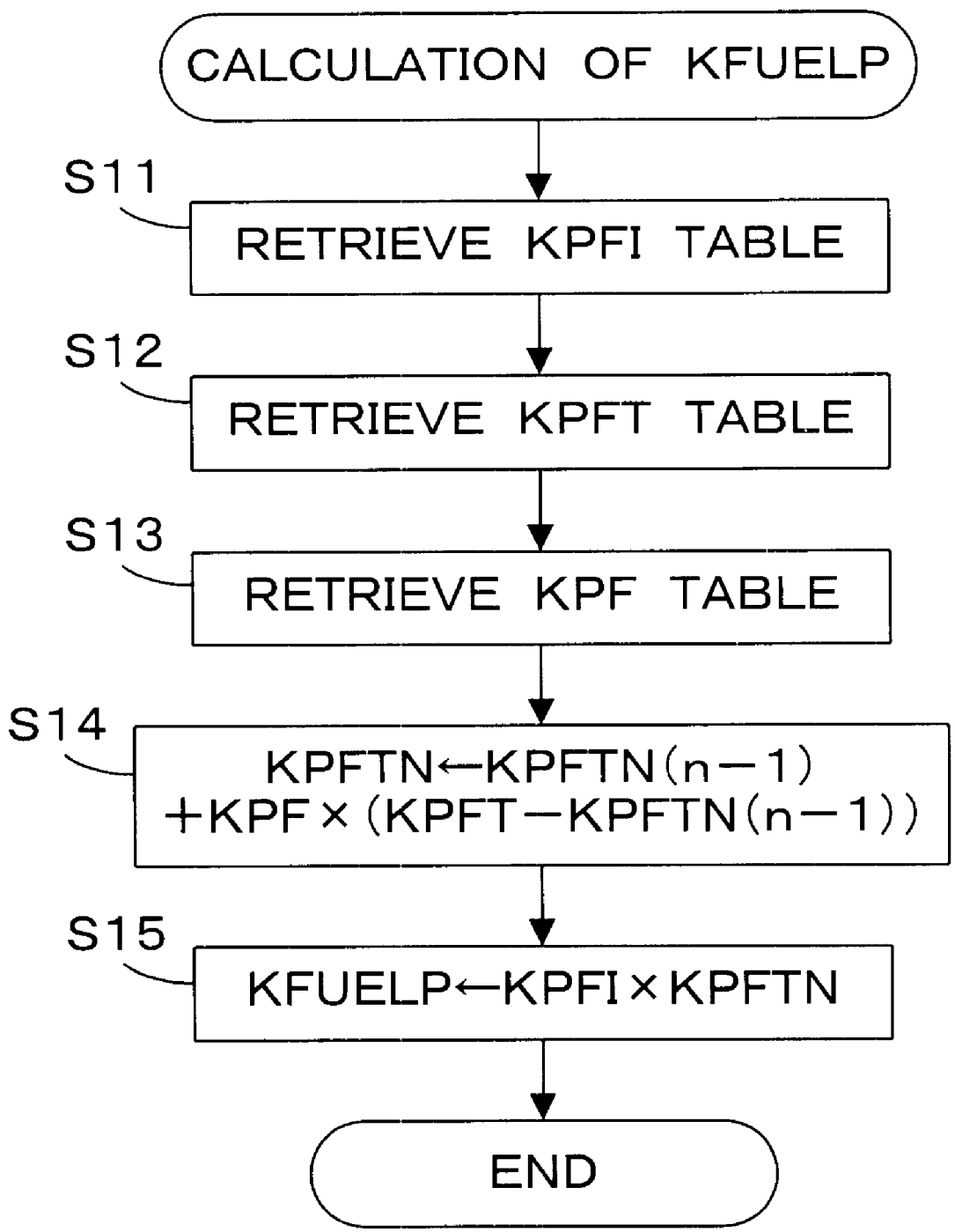
FIG. 2 is a flow chart showing a process for calculating a fuel pressure correction coefficient.

FIG. 2 is a flow chart showing a process for calculating the fuel pressure correction coefficient KFUELP in the expression (2). This process is executed in synchronism with the generation of a TDC signal pulse.

Figure 3A:
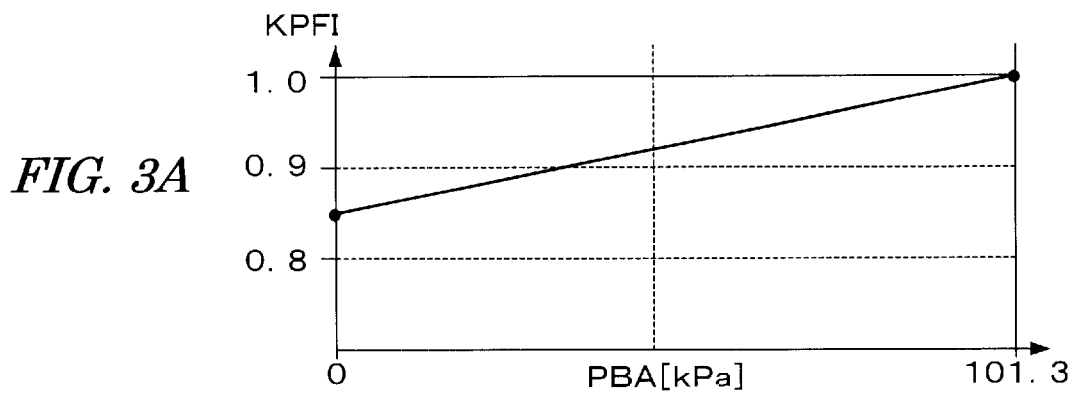
FIGS. 3A–3C.

In step S11, an intake pipe pressure correction coefficient KPFI is calculated by retrieving a KPFI table shown in FIG. 3A according to the intake pipe absolute pressure PBA. The KPFI table is set so that the correction coefficient KPFI increases as the intake pipe absolute pressure PBA becomes higher and KPFI is equal to "1.0" when PBA is equal to a value (=101.3 kPa) equivalent to the atmospheric pressure. As shown by a thick sold line in FIG. 3C, the fuel pressure PF does not change depending on a change in the intake pipe absolute pressure PBA. Accordingly, as the intake pipe absolute pressure PBA becomes higher, a pressure difference between the fuel pressure PF and the intake pipe absolute pressure PBA decreases and thereby a fuel injection amount corresponding to the same valve opening period is reduced. Therefore, the intake pipe pressure correction coefficient KPFI is set so that the valve opening period TOUT of the fuel injection valve increases as the intake pipe absolute pressure PBA becomes higher.

Figure 3B:
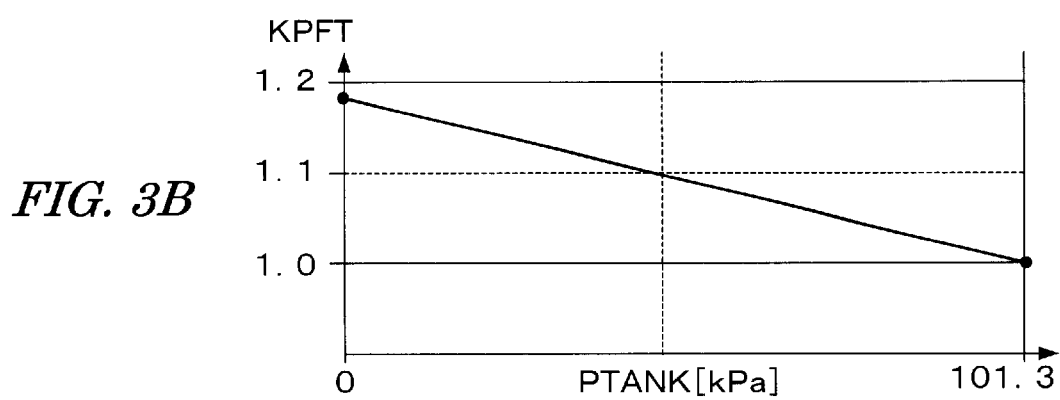
Figure 3C:
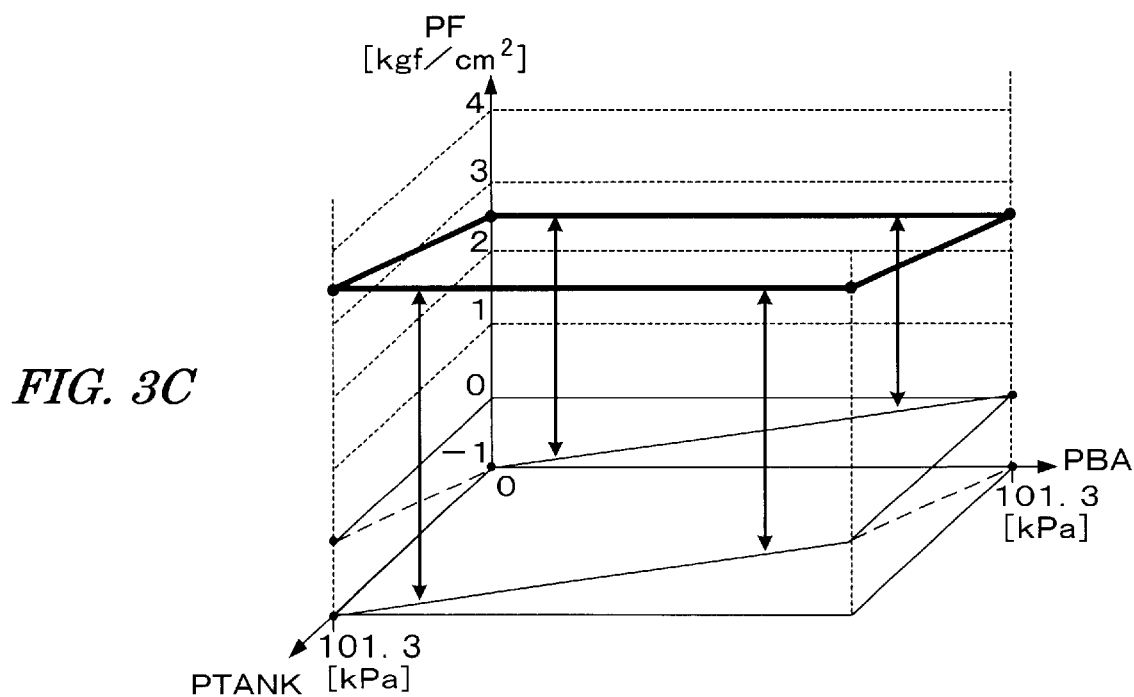

In step S12, a tank pressure correction coefficient KPFT is calculated by retrieving a KPFT table shown in FIG. 3B according to the tank pressure PTANK. The KPFT table is set so that the correction coefficient KPFT decreases as the tank pressure PTANK becomes higher and KPFT is equal to "1.0" when PTANK is equal to a value (=101.3 kPa) equivalent to the atmospheric air. As shown by a thick sold line in FIG. 3C, the fuel pressure PF increases with an increase in the tank pressure PTANK. Accordingly, as the tank pressure PTANK becomes higher, a pressure difference between the fuel pressure PF and the intake pipe absolute pressure PBA increases and thereby a fuel injection amount for the same valve opening period increases. Therefore, the tank pressure correction coefficient KPFT is set so that the valve opening period TOUT of the fuel injection valve decreases as the tank pressure PTANK becomes higher.

Figure 4:
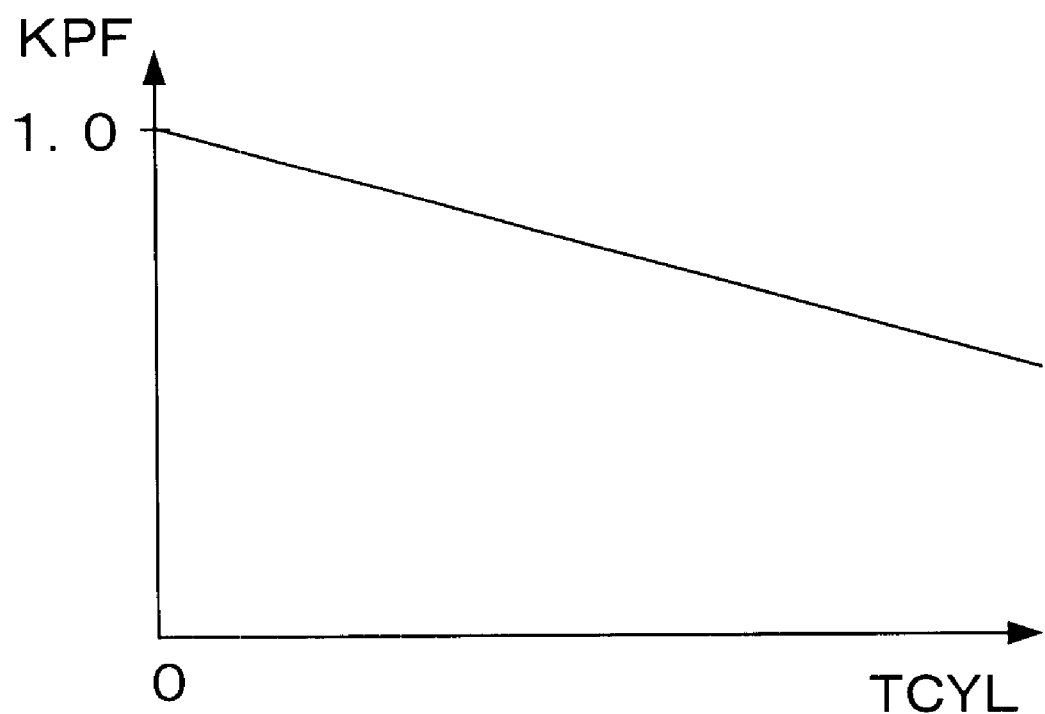
FIG. 4 is a table for calculating a required fuel amount correction coefficient.

In step S13, a required fuel amount correction coefficient KPF is calculated by retrieving a KPF table shown in FIG. 4 according to the required fuel amount TCYL. The KPF table is set so that the correction coefficient KPF decreases as the required fuel amount TCYL increases.

Subsequently, a modified tank pressure correction coefficient KPFTN is calculated by applying the tank pressure correction coefficient KPFT calculated in step S12 and the required fuel amount correction coefficient KPF calculated in step S13 in the following expression (3) (step S14).

$$KPFTN=KPFTN(n-1)+KPF\times(KPFT-KPFTN(n-1)) \qquad (3)$$

In the expression (3), (n−1) is suffixed to indicate a preceding calculated value.

In step S15, the fuel pressure correction coefficient KFUELP is calculated by multiplying the intake pipe pressure correction coefficient KPFI by the modified tank pressure correction coefficient KPFTN.

According to the expression (3), in a stationary state where the tank pressure PTANK is kept constant, the modified tank pressure correction coefficient KPFTN becomes nearly equal to the tank pressure correction coefficient KPFT. On the other hand, when the tank pressure PTANK changes, a follow-up rate of the modified tank pressure correction coefficient KPFTN to the change in the tank pressure PTANK (change rate of a correction amount of the valve opening period calculated using the modified tank pressure correction coefficient KPFTN) decreases as the required fuel amount correction coefficient KPF decreases. This matches with the tendency that as the required fuel amount TCYL increases, a time lag until the change in the tank pressure PTANK actually exerts an effect on the fuel injection amount becomes longer.

The fuel injection amount in a transient state where the tank pressure PTANK changes can be accurately controlled by calculating the fuel pressure correction coefficient KFUELP using the modified tank pressure correction coefficient KPFTN calculated from the expression (3), and applying the fuel pressure correction coefficient KFUELP in the expression (2).

In this embodiment, for example, the ECU 5 constitutes fuel injection amount control means, first correcting means, required fuel amount calculating means, and second correcting means. Specifically, the calculations based on the expressions (1) and (2) correspond respectively to the required fuel amount calculating means and the fuel injection amount control means. Steps S11, S12 and S15 of FIG. 2, and the calculation based on the expression (2) correspond to the first correcting means. Steps S13 to S15 correspond to the second correcting means. Also the evaporative fuel passage 20, the tank pressure control valve 30, and the ECU 5 which controls the operation of the tank pressure control valve 30, constitute pressure reducing means.

The ECU 5, for example, also constitutes a fuel injection amount control module, a first correcting module, a required fuel amount calculating module, and a second correcting module. Specifically, the calculations based on the expressions (1) and (2) correspond respectively to the required fuel amount calculating module and the fuel injection amount control module. Steps S11, S12 and S15 of FIG. 2, and the calculation based on the expression (2) correspond to the first correcting module. Steps S13 to S15 correspond to the second correcting module. Also the evaporative fuel passage 20, the tank pressure control valve 30, and the ECU 5 which controls the operation of the tank pressure control valve 30, constitute a pressure reducing module.

The present invention is not limited to the above-described embodiment but may be variously modified. For example, according to the above-described embodiment, the present invention is applied to an engine mounted on the vehicle including the evaporative fuel emission preventing device for always keeping the pressure in the fuel tank at a negative pressure. The present invention may be applied to an engine mounted on a vehicle which is not provided with the pressure reducing means for reducing the pressure fuel tank to a negative pressure. However, since the tank pressure correction coefficient KPFT largely changes when keeping the pressure in the fuel tank at a negative pressure, it is possible to obtain a more significant effect when the present invention is applied to an engine mounted on a vehicle configured so that the pressure in the fuel tank is kept at a negative pressure.

The intake pipe pressure detecting means is configured as the intake pipe absolute pressure sensor 13 in the above-described embodiment. However, in place of detection of an actual pressure by the sensor, as described in Japanese Patent Laid-open No. Hei 7-91307 for example, the intake pipe pressure detecting means may be configured by a process of estimating the intake pipe pressure on the basis of the throttle valve opening degree THA and the engine rotational speed NE.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having a fuel tank and a fuel intake line coupled thereto, said control system comprising:
    at least one fuel injection valve for injecting fuel supplied from the fuel tank into the intake pipe of the engine;
    fuel injection amount control means for controlling the fuel injection amount by controlling the valve opening period of the at least one fuel injection valve;
    fuel pressure control means provided in the fuel tank for controlling the pressure difference between the pressure of fuel supplied to the at least one fuel injection valve and the pressure in the fuel tank such that the pressure difference is at a constant value;
    fuel tank pressure detecting means for detecting the pressure in the fuel tank;
    intake pipe pressure detecting means for detecting the pressure in the intake pipe;
    first correcting means for calculating a correction amount according to the pressure in the fuel tank and the pressure in the intake pipe, and correcting the valve opening period of the at least one fuel injection valve as a function of the calculated correction amount;
    required fuel amount calculating means for calculating a required amount of fuel to be supplied to the engine as a function of an operating condition of the engine; and
    second correcting means for correcting the change rate of the correction amount calculated by the first correcting means, according to the required fuel amount.

2. A control system according to claim 1, wherein the first correcting means corrects the valve opening period of the at least one fuel injection valve such that the valve opening period becomes longer as the pressure in the intake pipe becomes higher.

3. A control system according to claim 1, wherein the first correcting means corrects the valve opening period of the at least one fuel injection valve such that the valve opening period becomes shorter as the pressure in the fuel tank becomes higher.

4. A control system according to claim 1, wherein the second correcting means corrects the change rate of the correction amount calculated by the first correcting means such that the change rate decreases as the required fuel amount increases.

5. A control system according to claim 1, further comprising pressure reducing means for reducing the pressure in the fuel tank to a value which is lower than the atmospheric pressure during operation and stoppage of the engine.

6. A control system for an internal combustion engine having a fuel tank and a fuel intake line coupled thereto, said control system comprising:
- at least one fuel injection valve for injecting fuel supplied from the fuel tank into the intake pipe of the engine;
- fuel injection amount control means for controlling the fuel injection amount by controlling the valve opening period of the at least one fuel injection valve;
- fuel pressure control means provided in the fuel tank for controlling the pressure difference between the pressure of fuel to be supplied to the at least one fuel injection valve and the pressure in the fuel tank such that the pressure difference is at a constant value;
- fuel tank pressure detecting means for detecting the pressure in the fuel tank;
- intake pipe pressure detecting means for detecting the pressure in the intake pipe;
- first correcting means for calculating a correction amount as a function of the pressure in the fuel tank and the pressure in the intake pipe, and correcting the valve opening period of the at least one fuel injection valve as a function of the calculated correction amount; and
- second correcting means for correcting the change rate of the correction amount calculated by the first correcting means, according to a non-corrected value of the valve opening period of the at least one fuel injection valve.

7. A control system for an internal combustion engine having a fuel tank and a fuel intake line coupled thereto, said control system comprising:
- at least one fuel injection valve for injecting fuel supplied from the fuel tank into the intake pipe of the engine;
- a fuel injection amount control module for controlling the fuel injection amount by controlling the valve opening period of the at least one fuel injection valve;
- a fuel pressure control module provided in the fuel tank for controlling the pressure difference between the pressure of fuel supplied to the at least one fuel injection valve and the pressure in the fuel tank such that the pressure difference is at a constant value;
- a fuel tank pressure sensor for detecting the pressure in the fuel tank;
- an intake pipe pressure sensor for detecting the pressure in the intake pipe;
- a first correcting module for calculating a correction amount as a function of the pressure in the fuel tank and the pressure in the intake pipe, and correcting the valve opening period of said at least one fuel injection valve as a function of the calculated correction amount;
- a required fuel amount calculating module for calculating a required amount of fuel to be supplied to the engine as a function of an operating condition of the engine; and
- a second correcting module for correcting a change rate of the correction amount calculated by the first correcting module, according to the required fuel amount.

8. A control system according to claim 7, wherein the first correcting module corrects the valve opening period of the at least one fuel injection valve such that the valve opening period becomes longer as the pressure in the intake pipe becomes higher.

9. A control system according to claim 7, wherein the first correcting module corrects the valve opening period of the at least one fuel injection valve such that the valve opening period becomes shorter as the pressure in the fuel tank becomes higher.

10. A control system according to claim 7, wherein the second correcting module corrects the change rate of the correction amount calculated by the first correcting module such that the change rate decreases as the required fuel amount increases.

11. A control system according to claim 7, further comprising a pressure reducing module for reducing the pressure in the fuel tank to a value which is lower than the atmospheric pressure during operation and stoppage of the engine.

12. A control system for an internal combustion engine having a fuel tank and a fuel intake line coupled thereto, said control system comprising:
- at least one fuel injection valve for injecting fuel supplied from the fuel tank into the intake pipe of the engine;
- a fuel injection amount control module for controlling the fuel injection amount by controlling the valve opening period of the at least one fuel injection valve;
- a fuel pressure control module provided in the fuel tank for controlling the pressure difference between the pressure of fuel to be supplied to the at least one fuel injection valve and the pressure in the fuel tank such that the pressure difference is at a constant value;
- a fuel tank pressure sensor for detecting the pressure in the fuel tank;
- an intake pipe pressure sensor for detecting the pressure in the intake pipe;
- a first correcting module for calculating a correction amount as a function of the pressure in the fuel tank and the pressure in the intake pipe, and correcting the valve opening period of the at least one fuel injection valve using the calculated correction amount; and
- a second correcting module for correcting the change rate of the correction amount calculated by the first correcting module, as a function of a non-corrected value of the valve opening period of the at least one fuel injection valve.

13. A control method for an internal combustion engine having at least one fuel injection valve for injecting fuel supplied from a fuel tank into an intake pipe of the engine, said control method comprising the steps of;
a) controlling the fuel injection amount by controlling the valve opening period of the at least one fuel injection valve;
b) controlling the pressure difference between the pressure of fuel supplied to the at least one fuel injection valve and the pressure in the fuel tank such that the pressure difference is maintained at a constant value;
c) detecting the pressure in the fuel tank;
d) detecting the pressure in the intake pipe;
e) calculating a correction amount according to the pressure in the fuel tank and the pressure in the intake pipe;
f) correcting the valve opening period of the at least one fuel injection valve as a function of the calculated correction amount;
g) calculating a required amount of fuel to be supplied to the engine as a function of an operating condition of the engine; and
h) correcting the change rate of the correction amount as a function of the required fuel amount.

14. A control method according to claim 13, wherein the valve opening period of the at least one fuel injection valve is corrected such that the valve opening period becomes longer as the pressure in the intake pipe becomes higher.

15. A control method according to claim 13, wherein the valve opening period of the at least one fuel injection valve is corrected such that the valve opening period becomes shorter as the pressure in the fuel tank becomes higher.

16. A control method according to claim 13, wherein the change rate of the correction amount calculated by the first correcting module is corrected such that the change rate decreases as the required fuel amount increases.

17. A control method according to claim 13, further comprising the step of reducing the pressure in the fuel tank to a value which is lower than the atmospheric pressure during operation and stoppage of the engine.

18. A control method for an internal combustion engine having at least one fuel injection valve for injecting fuel supplied from a fuel tank into an intake pipe of the engine, said control method comprising the steps of;

a) controlling the fuel injection amount by controlling the valve opening period of the at least one fuel injection valve;
b) controlling the pressure difference between the pressure of fuel to be supplied to the at least one fuel injection valve and the pressure in the fuel tank such that the pressure difference is maintained at a constant value;
c) detecting the pressure in the fuel tank;
d) detecting the pressure in the intake pipe;
e) calculating a correction amount as a function of the pressure in the fuel tank and the pressure in the intake pipe;
f) correcting the valve opening period of the at least one fuel injection valve as a function of the calculated correction amount; and
g) correcting the change rate of the correction amount as a function of a non-corrected value of the valve opening period of the at least one fuel injection valve.

* * * * *